United States Patent Office 3,528,666
Patented Sept. 15, 1970

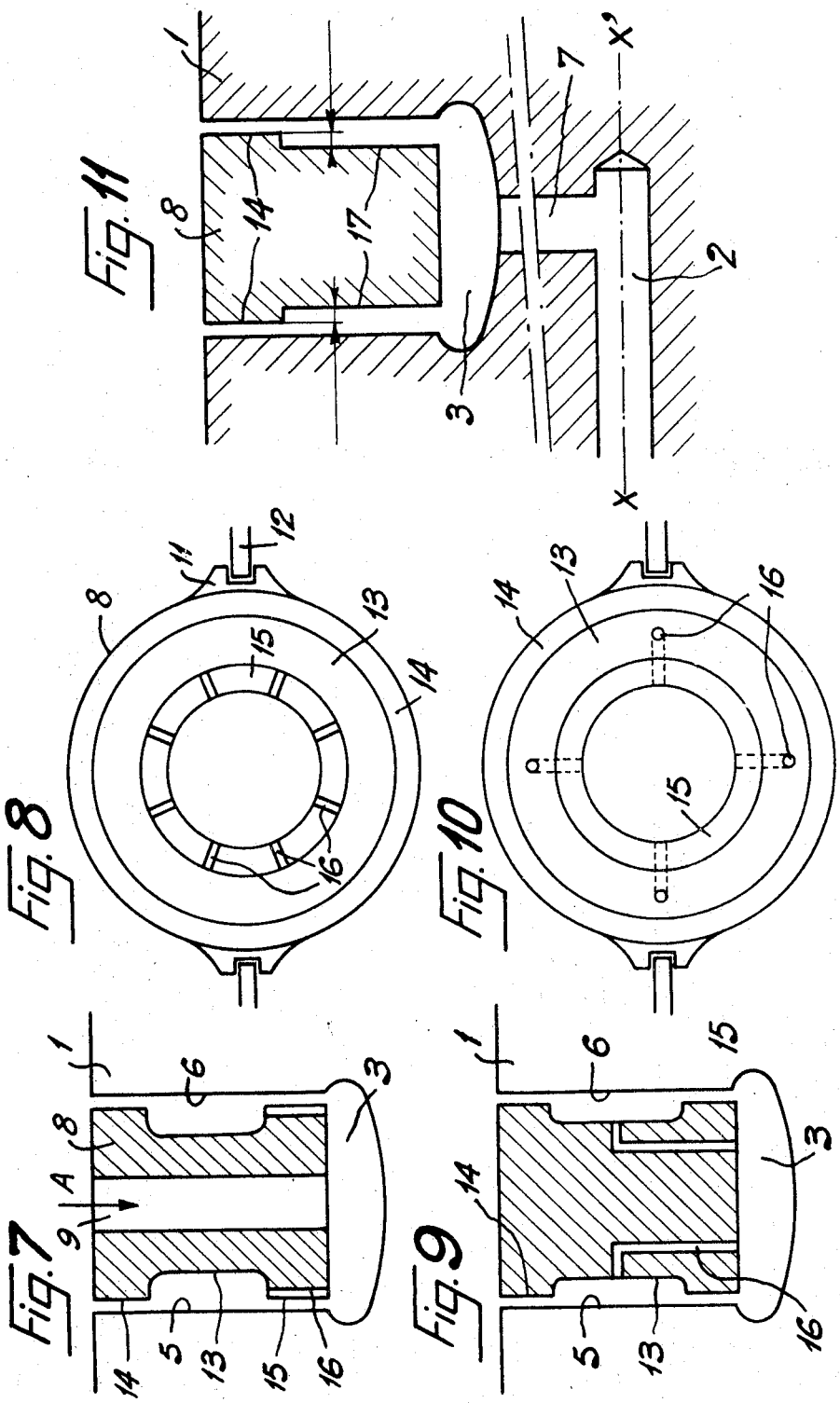

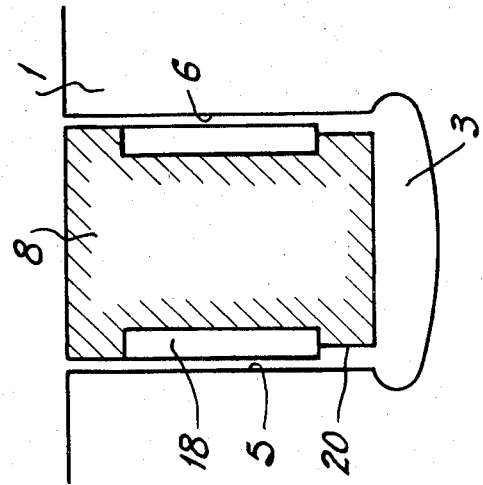
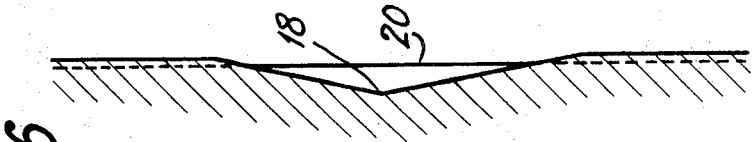
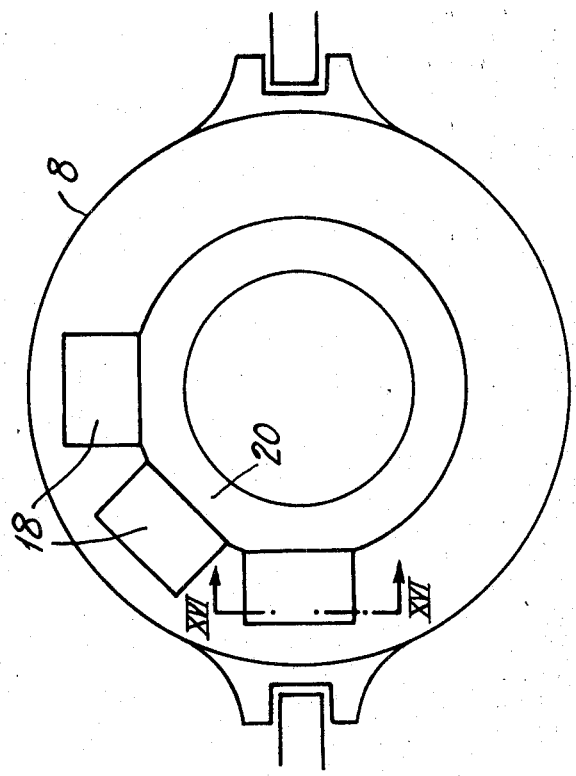

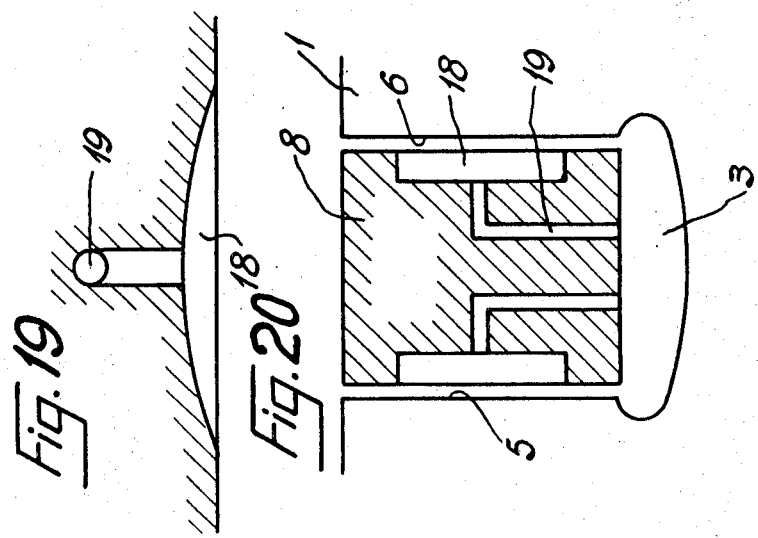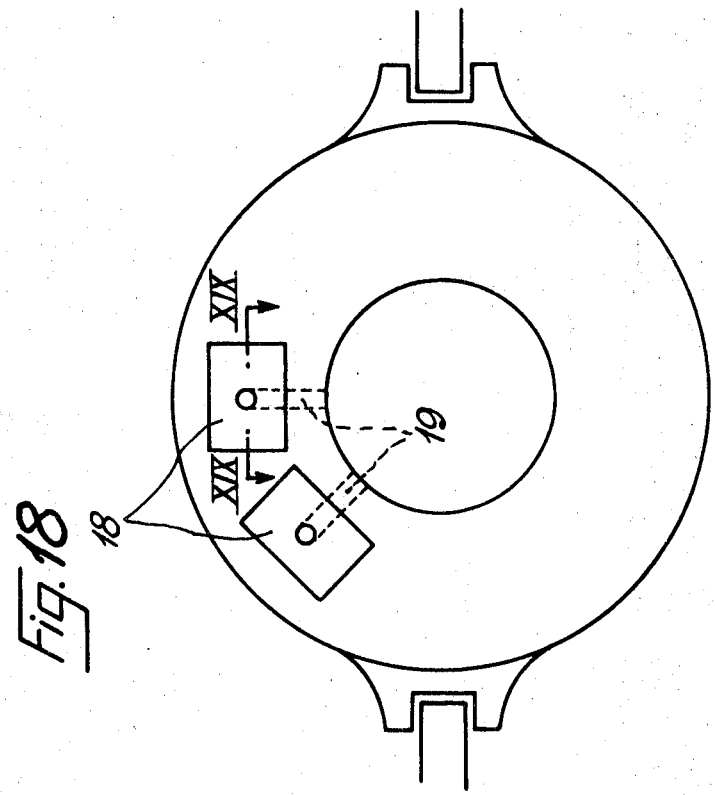

3,528,666
LATERAL PRESSURE-FLUID INFEED FOR A ROTATING SHAFT
Joseph C. M. Prampart, Nantes, Loire (Atlantique), France, assignor to Societe Financiere et Industrielle des Ateliers et Chantiers de Bretagne, Nantes, Loire (Atlantique), France, a French company
Filed May 8, 1967, Ser. No. 636,834
Claims priority, application France, July 21, 1966, 70,334
Int. Cl. F16j 15/16
U.S. Cl. 277—27
9 Claims

ABSTRACT OF THE DISCLOSURE

Lateral pressure-fluid infeed means for a hollow rotating object such as a shaft, by means of a non-rotating annular sealing member which encircles the shaft and provides a connection to an appropriate pressure fluid source, characterised in that the annular sealing member comprises a ring bounding low-leak gaps on either side of the orifice through which fluid is introduced into the shaft, the ring being adapted to be centered automatically opposite such orifice by the pressures produced between the adjacent surfaces of the ring and shaft.

---

This invention relates to lateral pressure-fluid infeed for a rotating hollow object such as a shaft.

This kind of problem is found, for instance, in ships having reversible screws whose blades are operated by means of hydraulic mechanisms fitted in the line of shafting and supplied, through passages in the shafts, with a liquid by stationary pumps. The usual way of solving the problem is to use some form of annular sealing means around the shaft to connect the same to the line from the pump.

According to this invention, the connecting means between the shaft and the pressure fluid supply line take the form of a non-rotating ring which extends around the shaft and to which such line is connected, the ring bounding low-leakage gaps on either side of the shaft orifice through which the fluid enters, the ring being adapted to be self-centring opposite such orifice as a result of the pressures between the adjacent surfaces of the ring and of the shaft. A rotating seal or gasket or the like is therefore provided in which there is no friction between the shaft and the ring and which enables the fluid to be introduced satisfactorily despite secondary bending, displacement, vibration and similar movements which the shaft may make when in operation and which the self-centring action of the ring compensates for automatically.

The invention can be embodied in various ways. For instance, the ring can be received in an annular groove in the shaft, the leakage gaps being left between the groove side walls and the ring side walls.

The following description, taken together with the accompanying exemplary non-limitative drawings, will make readily apparent how the invention can be practiced; features disclosed by the drawings and the text form of course part of the invention.

Figure 1:
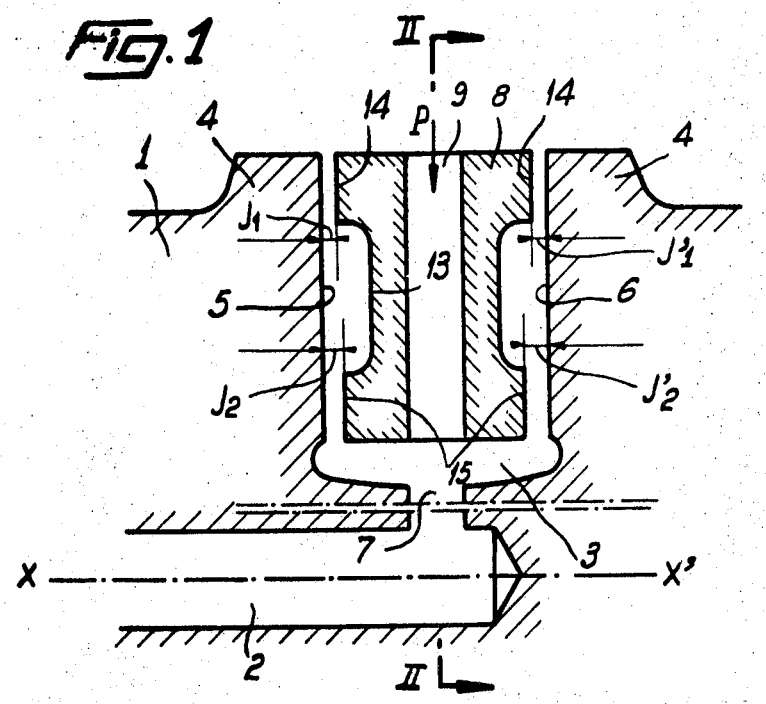
Figure 2:
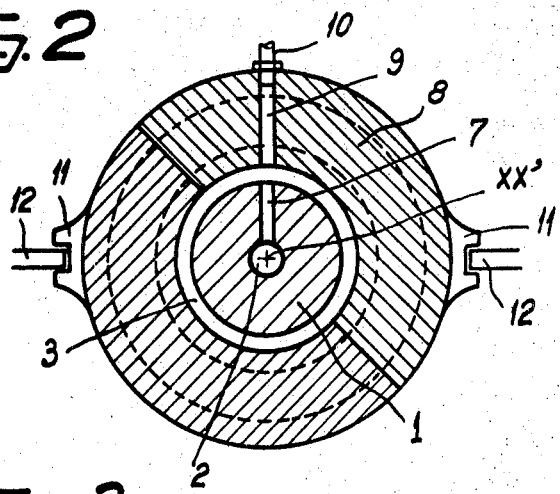
Figure 3:
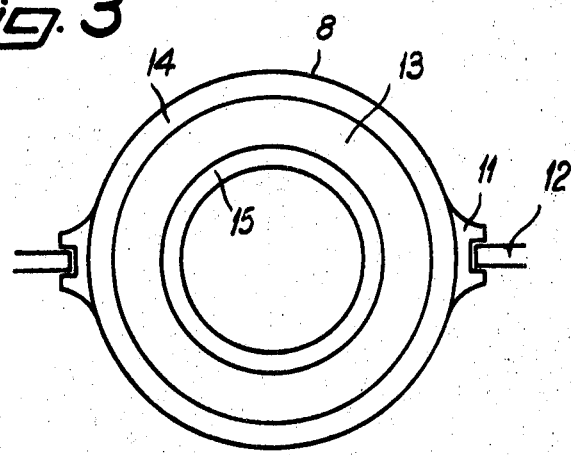
Figure 4:
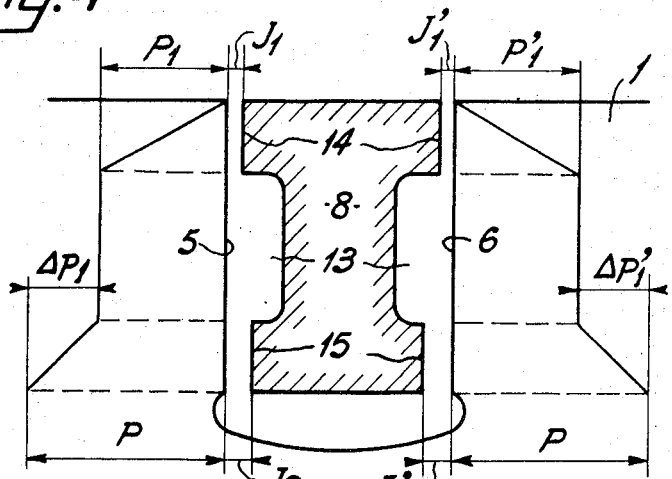
Figure 5:
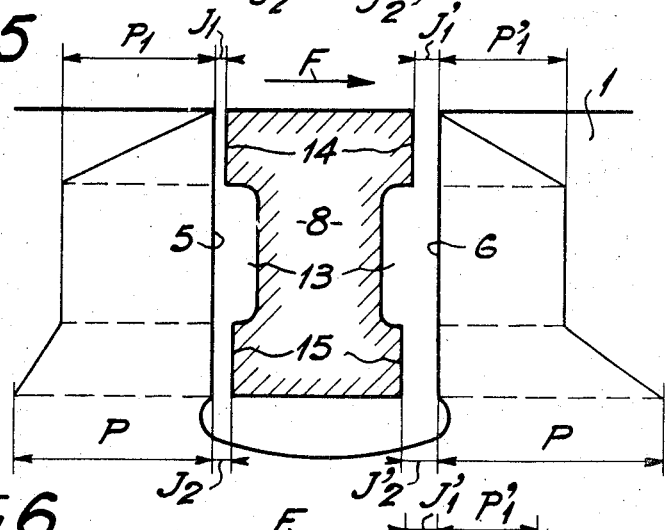
Figure 6:
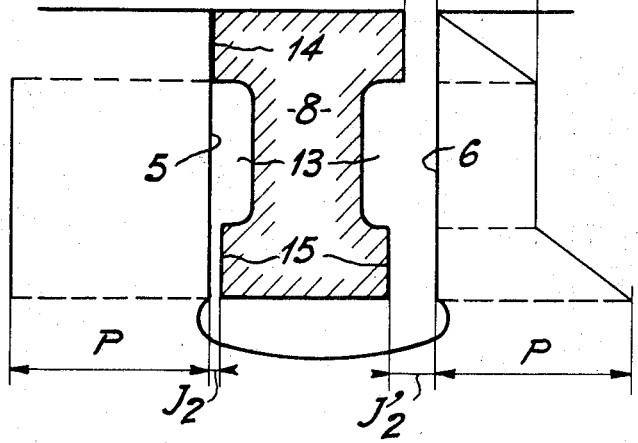
Figure 14:
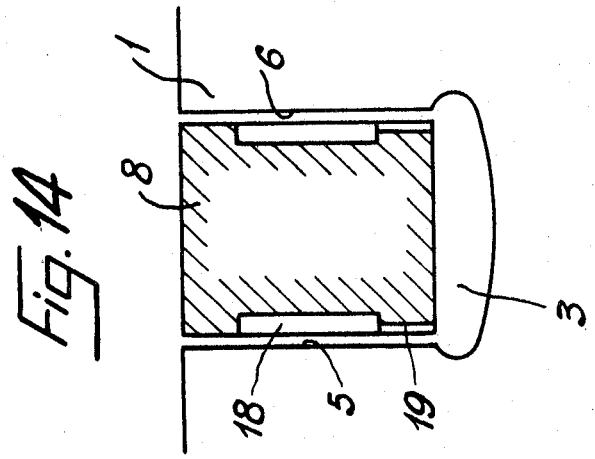
Figure 13:
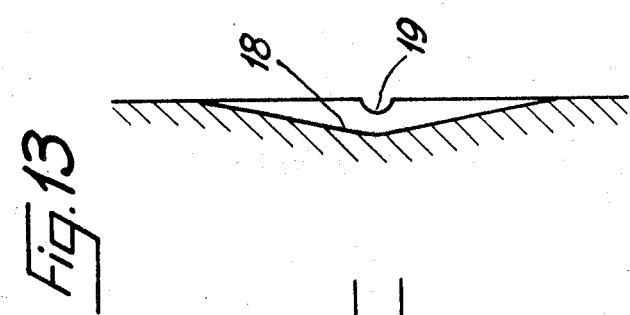
Figure 12:
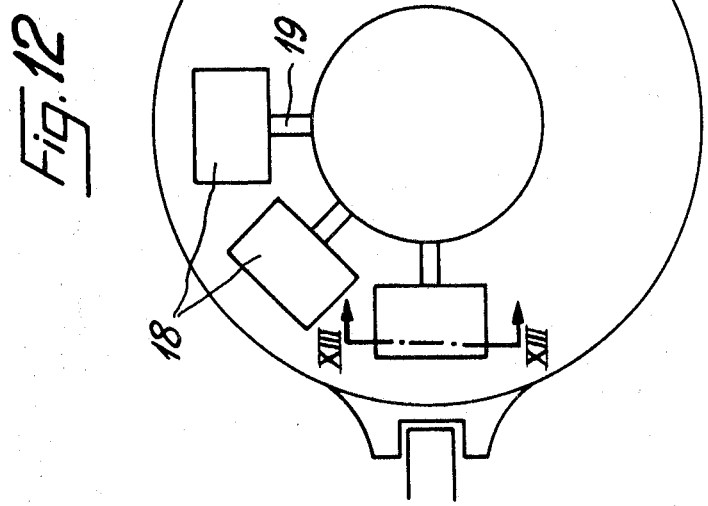

In the drawings:
FIG. 1 is a view partly in section of a shaft devised in accordance with the invention;
FIG. 2 is a view in cross-section to a reduced scale along the line II—II of FIG. 1;
FIG. 3 is a side view of the ring shown in FIGS. 1 and 2;
FIGS. 4, 5 and 6 are diagrammatic views showing how the system shown in FIGS. 1–3 operate;
FIG. 7 is a view in partial section of a first variant;
FIG. 8 is a side view of the ring shown in FIG. 7;
FIGS. 9 and 10 are views which are respectively similar to FIGS. 7 and 8 which relates to a second variant;
FIG. 11 is a view in partial cross-section of a third variant;
FIG. 12 is a side view of a fourth variant of the ring;
FIG. 13 is a section along the line XIII—XIII of FIG. 12;
FIG. 14 is a view in partial section showing the ring positioned around the shaft;
FIGS. 15–17 are views which are respectively similar to FIGS. 12–14 but which relate to a fifth variant, and
FIGS. 18–20 relate similarly and respectively to a sixth variant.

In the embodiment shown in FIGS. 1–6 a rotating shaft 1 is pierced with a longitudinal passage 2 into which it is required to introduce a pressure fluid P.

Accordingly, the shaft 1 is formed with a peripheral groove 3 which is flanked by two reinforcing shoulders 4 and which has two plane side surfaces 5, 6 perpendicular to the shaft axis X–X'. The groove base, which is relieved, communicates with the passage 2 via one or more transverse passages 7. The groove 3 receives a ring 8. The same takes the form of two rigidly interconnected parts and is formed with: a central orifice or inlet channel 9, which can be connected by a connector 10 (FIG. 2) to an appropriate pressure fluid source, such as a pump or a compressor; and lugs 11 each formed in a longitudinal slot engaged by a guide 12 parallel to the shaft axis X–X' so that the ring 8 is kept substantially centred on such axis with provision for reduced axial movements.

The ring 8, whose outer diameter is here (in this embodiment) substantially equal to the diameter of the shoulders 4, has a maximum width which is slightly less than the distance between the groove surfaces 5 and 6, so that only a reduced clearance is left opposite the latter surfaces. The ring cross-section is such that the pressure of the fluid entering via the orifice 9 tends to centre the ring between the walls 5 and 6 but without making the ring knock against either of such walls. There are very many possible cross-sectional shapes for the ring 8 and only a few examples are given herein.

As can be gathered inter alia from FIGS. 1 and 3, the ring 8 can be formed in each of its side surfaces with a central groove 13 which is bordered by annular shoulders 14, 15, forming an internal recessed portion on each radial face of ring 8. The outer shoulders 14 project more than do the inner shoulders 15 so that the clearance $J_1$, $J'_1$ between the shoulders 14 and the groove surfaces 5, 6 are less than the clearances $J_2$, $J'_2$ between the shoulders 15 and the surfaces 5, 6 (FIG. 1).

The ring operates as follows:

The fluid introduced via the orifice 9 at the pressure P enters the passage 2 of the shaft 1; since the maximum width of the ring 8 is slightly less than the width of the groove 3, there is a leakage of oil, which may be very slight, between the shaft and the ring. The fluid pressure drops from P to zero along the groove surfaces 5 and 6.

Assuming that, as shown in FIG. 4, the ring is centered in the groove 3, pairs of clearances are equal on both sides of the ring ($J_1=J'_1$ and $J_2=J'_2$). The leakage flows on both sides are therefore the same and the pressure distribution along the groove surfaces 5, 6 are symmetrical. As the side diagrams shown in FIG. 4 indicate, the pressure experiences a first pressure drop P1 from the value P at the inner edge of the ring to the value P1 at the outer edge of the annular shoulder 15, then remains substantially constant at P1 over the width of the chamber formed by the groove 13, then drops from P1 to zero along the shoulder 14. The pressure are symmetrical on both sides and the ring takes up an equilibrium position in its groove.

FIG. 5 shows what happens when the ring 8 shifts along the shaft axis. In this case if, for instance, the clearance J1 is less than the clearance J2, the mean pressure of the side corresponding to the surface 5 is higher than on the other side, as the side diagrams show; consequently, a force F is produced which tends to restore the ring to its central position in the groove.

In the extreme case, when the ring engages by one of its shoulders 14 against one of the groove side surfaces, for instance, the surface 5, as shown in FIG. 6, the rate of flow along such surface drops to zero and there is a constant pressure P on the whole surface of the shoulder 15 and on the groove 13, whereas on the opposite surface 6 which is furthest away from the surface 6 pressures are lowest. As in the case just mentioned, a force F is produced which tends to restore the ring to its central position.

The rate of leakage flow, and the strength of centring force for any given longitudinal displacement, can be determined in dependence upon the values selected for the clearances J1, J'1, J2 and J'2 and for the dimensions of the annular shoulders 14, 15 and of the groove 13. In short, the ring is in a stable position when the pressure distribution over its two surfaces are the same. Any shift of the ring parallel to the axis of rotation produces a force tending to restore the ring to its central position in the groove.

The variant shown in FIGS. 7 and 8 operates like the embodiment hereinbefore described. The ring 8 has the annular shoulders 14, 15 which are separated from one another by the groove 13. The shoulders 14, 15 can be disposed in pairs in the same plane since passages 16 distributed regularly around the ring axis are contrived in the inner shoulder 15 so that there is always access to the pressure chamber formed by the groove 13 even when the ring is in abutting relationship with any of the groove surfaces 5 or 6, and so that the ring tends to be restored to its central position as in the previous example.

The only difference between the embodiment shown in FIGS. 9 and 10 and the embodiment just described is that in FIGS. 9 and 10 the pasages 16, instead of being open in the shoulders 15, are contrived in the ring body and take the form of calibrated orifices via which the ring inside surface is connected to the base of the grooves 13; the operation is still the same.

In the variant shown in FIG. 11, the ring is simpler than in the previous embodiments since it comprises only the annular shoulders 14; the remainder 17 of the ring side surface is recessed from the shoulders 14 by an amount which can be chosen to suit individual cases.

The rings disclosed by FIGS. 12–20 have their side surfaces formed with cavities 18 which are distributed regularly and symmetrically around the ring axis. The cavities 18 communicate with the ring inside surface so as to form pressure chambers even when the ring is in abutting relationship with either of the groove side surfaces 5 or 6. Communication can be by way of passages 19 either open in the ring surface (FIGS. 12–14) or contrived in the ring body (FIGS. 18–20) or by way of a peripheral relief 20 of the inside edges of the ring side surfaces, as shown in FIGS. 15–17. In all cases the ring operates as previously described.

The embodiments hereinbefore described can of course be modified, inter alia by the substitution of equivalent technical means, without for that reason departing from the scope of this invention.

I claim:
1. Lateral pressure-fluid infeed means for a hollow rotating object such as a shaft, comprising a non-rotative annular sealing means engaged in a groove in said shaft, said sealing means having an inlet channel therein for connection to an appropriate pressure fluid source, and a configuration such that the width thereof is maximized at its outer edge, and annular radial surfaces thereof extend from a non-interrupted circumferential plane portion terminating in outer edges to an internal recessed portion; and said groove having inlet means therein communicating with the interior of said shaft, and having plane sidewalls extending in a direction perpendicular to the longitudinal axis of said shaft, said sidewalls coacting with the radial surfaces of said sealing means such that the recessed portions thereof communicate with an interior surface of said groove and said inlet means in said groove even when said circumferential plane portion is applied against the corresponding sidewall of said groove.

2. The means specified in claim 1, characterised in that the ring has in each of its side surfaces two concentric annular shoulders separated from one another by a groove, means being provided such that the groove can communicate with the ring inside surface even when the ring is in abutting engagement with any of the shaft groove surfaces.

3. The means specified in claim 2, characterised in that the annular shoulder which is of smaller diameter is recessed relatively to the other annular shoulder.

4. The means specified in claim 1, characterised in that the passages are open and contrived in the smaller diameter annular shoulder.

5. The means specified in claim 1, characterised in that the passages are contrived in the ring body in the form of calibrated orifices.

6. The means specified in claim 1, characterised in that the ring has on each side surface only one annular shoulder disposed near its larger-diameter portion.

7. The means specified in claim 1, characterised in that the ring has in each side surface cavities which are distributed regularly around the ring axis and which communicate with the ring inside surface even when the ring is in abutting engagement with any of the groove side surfaces.

8. The means specified in claim 7, characterised in that communication is by way of passages in the ring.

9. The means specified in claim 7, characterised in that communication is by way of a relieving of the smaller-diameter portion of the ring.

References Cited

UNITED STATES PATENTS

| | | | |
|---|---|---|---|
| 3,408,085 | 10/1968 | Van Spijk et al. | 277—72 |
| 1,689,874 | 10/1928 | Jabs | 277—27 |
| 2,270,927 | 1/1942 | Browne. | |
| 2,538,422 | 1/1951 | Kollsman | 277—27 |
| 2,621,946 | 12/1952 | Jendrassik | 277—74 |
| 3,047,299 | 7/1962 | Karsten | 277—74 X |
| 3,093,382 | 1/1963 | Macks | 277—27 |
| 3,315,968 | 4/1967 | Hanlon | 277—27 X |
| 3,347,552 | 10/1967 | Frisch | 277—27 |

FOREIGN PATENTS

| | | |
|---|---|---|
| 1,109,866 | 10/1955 | France. |

SAMUEL ROTHBERG, Primary Examiner

U.S. Cl. X.R.

277—70, 72, 75